US009321328B2

(12) United States Patent
Kong (10) Patent No.: US 9,321,328 B2
(45) Date of Patent: Apr. 26, 2016

(54) AIR VENT FOR VEHICLE (75) Inventor: Byung Seok Kong, Gunpo-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 1119 days.

(21) Appl. No.: 13/302,785

(22) Filed: Nov. 22, 2011

(65) Prior Publication Data

US 2013/0012114 A1 Jan. 10, 2013

(30) Foreign Application Priority Data

Jul. 5, 2011 (KR) ........................ 10-2011-0066480

(51) Int. Cl.
*B60H 1/26* (2006.01)
*B60H 1/34* (2006.01)

(52) U.S. Cl.
CPC ...... *B60H 1/3421* (2013.01); *B60H 2001/3478* (2013.01)

(58) Field of Classification Search
CPC .............. B60H 1/3421; B60H 2001/3478; B60H 1/0066; B60H 1/00671; B60H 2001/00707; B60H 2001/00714
USPC ........................................................ 454/145
See application file for complete search history.

(56) References Cited

U.S. PATENT DOCUMENTS

| | | | | |
|---|---|---|---|---|
| 1,818,438 A * | 8/1931 | Tracy | ...................... | E06B 7/084 454/224 |
| 2,394,059 A * | 2/1946 | Hite | ...................... | F24F 13/15 454/212 |
| 3,110,936 A * | 11/1963 | Berard | ........................... | 49/91.1 |
| 3,591,980 A * | 7/1971 | Cheng | ..................... | F24F 13/15 49/403 |
| 3,653,317 A * | 4/1972 | Costanzo, Jr. | ................ | 454/319 |
| 4,043,258 A * | 8/1977 | Zitko | ................... | B60H 1/3428 454/319 |
| 4,263,842 A * | 4/1981 | Moore | .......................... | 454/318 |
| 4,272,013 A * | 6/1981 | Diermayer | .............. | F23N 3/047 137/62 |
| 5,769,709 A * | 6/1998 | Kim | .............................. | 454/318 |
| 6,135,418 A * | 10/2000 | Hatton | .......................... | 251/306 |
| 6,974,378 B2 * | 12/2005 | Osada et al. | .................... | 454/155 |
| 7,354,340 B2 * | 4/2008 | Mochizuki et al. | ........... | 454/152 |
| 8,043,148 B2 * | 10/2011 | Eguchi et al. | ................. | 454/262 |
| 2006/0057951 A1 * | 3/2006 | Jung | ............................ | 454/143 |
| 2006/0252362 A1 * | 11/2006 | Ito et al. | ....................... | 454/156 |
| 2007/0264925 A1 * | 11/2007 | Mediato | ........................ | 454/154 |
| 2010/0139308 A1 * | 6/2010 | Eguchi et al. | ................. | 454/152 |

FOREIGN PATENT DOCUMENTS

| | | | | |
|---|---|---|---|---|
| GB | 623828 A | * | 5/1949 | |
| JP | 58097515 A | * | 6/1983 | .............. B60H 3/00 |
| JP | 2004-142713 A | | 5/2004 | |
| JP | 2004-262352 A | | 9/2004 | |

(Continued)

*Primary Examiner* — Alissa Tompkins
*Assistant Examiner* — Phillip E Decker
(74) *Attorney, Agent, or Firm* — Morgan, Lewis & Bockius LLP (57) ABSTRACT

An air vent apparatus for a vehicle may include a spacer securely mounted to an inner surface of a duct and having a plurality of partition walls protruding in an inner space thereof, and a plurality of inside wings rotatably coupled to the spacer and opening or closing the duct wherein the inside wings have respectively overlapping parts for overlapping with the partition walls when the inside wings close the duct so as to increase a duct sealing force between the inside wings and the spacer.

9 Claims, 8 Drawing Sheets

(56) References Cited

FOREIGN PATENT DOCUMENTS

| | | | | |
|---|---|---|---|---|
| JP | 2004262352 | A | * | 9/2004 |
| JP | 2009-46069 | A | | 3/2009 |
| JP | 2009046069 | A | * | 3/2009 |
| JP | 2010-89529 | A | | 4/2010 |
| JP | 2010089529 | A | * | 4/2010 |
| KR | 2001-0055614 | A | | 7/2001 |
| KR | 2002-0039728 | A | | 5/2002 |
| KR | 10-2009-0130598 | A | | 12/2009 |

* cited by examiner

AIR VENT FOR VEHICLE

CROSS-REFERENCE TO RELATED APPLICATION

The present application claims priority to Korean Patent Application No. 10-2011-0066480, filed on Jul. 5, 2011, the entire contents of which is incorporated herein for all purposes by this reference.

BACKGROUND OF THE INVENTION

1. Field of the Invention

The present invention relates, in general, to air vents for vehicles and, more particularly, to a technique relating to an air vent for a vehicle, which can increase a duct sealing force, thereby minimizing the amount of air leaking from the duct and yet preventing the air from generating a whistling noise.

2. Description of Related Art

Figure 1:
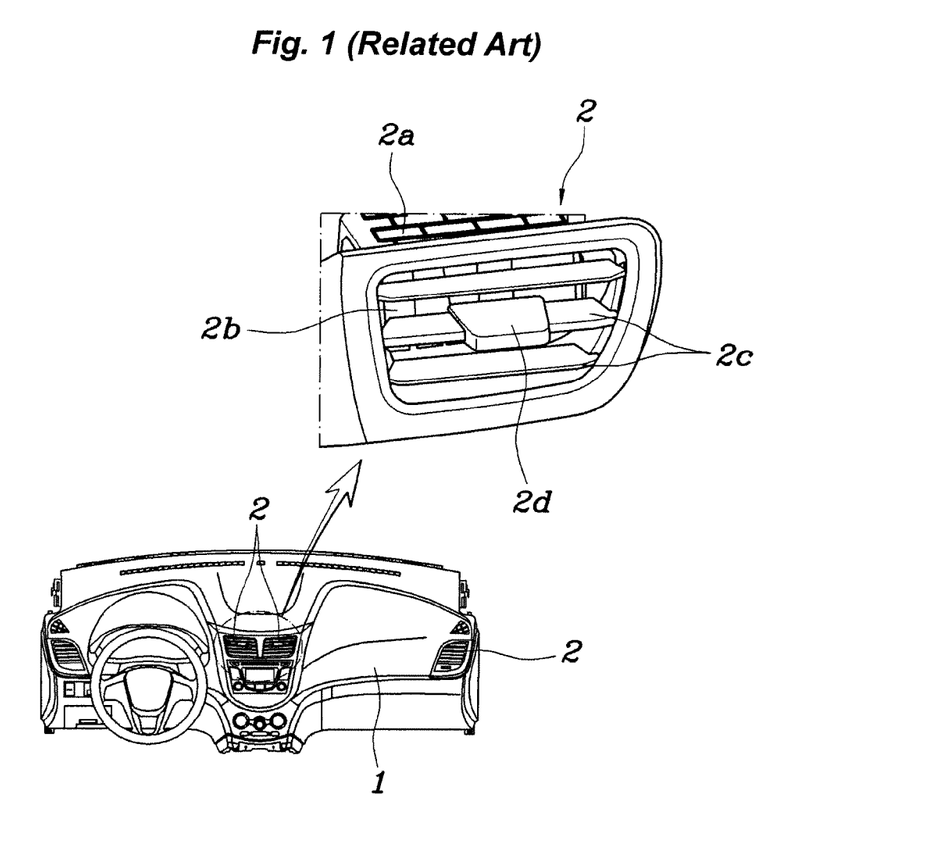
FIG. 1 is a view of an air vent provided in a dashboard.

As shown in FIG. 1, a dashboard 1 of a vehicle is typically provided with an air vent 2 for discharging cool or hot air into a passenger compartment.

A conventional air vent 2 includes a duct 2a that guides air into a passenger compartment, a plurality of inside wings 2b that can be rotated so as to switch the direction air is discharged in between the left and right, a plurality of outside wings 2c that can be rotated so as to switch the direction air is discharged in between up and down, and a tab 2d that allows a user to rotate the inside and outside wings 2b and 2c and thereby to change the directions of the inside and outside wings 2b and 2c.

The inside wings 2b can be rotated to the left and right around respective hinges provided in the upper and lower ends thereof and are called "vertical wings" The outside wings 2c can be rotated upwards and downwards around respective hinges provided in the left and right ends thereof and are called "horizontal wings".

The tab 2d is connected to the inside wings 2b and to the outside wings 2c so that, when a user moves the tab 2d to the left or right, the tab 2d can be moved along an outside wing 2c and rotate the inside wings 2b in the same direction. however, when a user moves the tab 2d upwards or downwards, the tab 2d can move only the outside wings 2c in the same direction.

Here, the inside wings 2b also function to close the duct 2a to prevent air from being discharged into the passenger compartment.

However, even when the inside wings 2b close the duct 2a, the inside wings 2b cannot completely close the duct 2a because a space allowing the inside wings 2b to be rotated without interference must be provided. Accordingly, the conventional air vent is problematic in that, even when the inside wings 2b close the duct 2a, a substantial amount of air may leak into the passenger compartment through the space provided for the rotation of the inside wings.

In the related art, in an effort to overcome the above-mentioned problem, an air vent structure capable of increasing the duct sealing force so as to desirably seal the duct 2a when the inside wings 2b close the duct 2a has been proposed. However, when the air vent is configured to increase the duct sealing force as described above, the inner pressure of the duct 2a may be increased, so that a substantial level of whistling noise may be generated along the path of passing air.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air vent for a vehicle, which has a structure capable of increasing the duct sealing force when the inside wings close the duct, thereby remarkably reducing the amount of air leaking to the passenger compartment, and which can prevent the air from generating a whistling noise along a path the air passes through.

In an aspect of the present invention, the air vent apparatus for a vehicle may include a spacer securely mounted to an inner surface of a duct and having a plurality of partition walls protruding in an inner space thereof, and a plurality of inside wings rotatably coupled to the spacer and opening or closing the duct wherein the inside wings may have respectively overlapping parts for overlapping with the partition walls when the inside wings close the duct so as to increase a duct sealing force between the inside wings and the spacer.

The spacer may further include a plate part securely mounted to the inner surface of the duct, and a plurality of hinge parts axially arranged on the inner surface of the plate part at regular intervals and protruding into an inner space of the duct and having respectively protrusion insert holes therein.

The partition walls are coupled to the hinge parts in an axial direction of the plate part, wherein the partition walls are connected to an upper circumference in one of two neighboring hinge parts and a lower circumference in the other of two neighboring hinge parts.

Opposite ends of each of the partition walls are coupled to associated hinge parts and form a stepped shape so that a coupled structure of the partition walls and the hinge parts in an axial direction of the plate part forms a stepped structure and the thickness of the partition walls is larger than the associated hinge parts.

Each of the partition walls may include a connection part for coupling associated hinge parts to each other, and a sealing part integrally protruding from the connection part and selectively overlapping with the overlapping part of an associated inside wing when the associated inside wing closes the duct.

Neither of opposite ends of the sealing part in an axial direction of the plate part is coupled to the associated hinge parts.

Opposite side surfaces of each of the inside wings are provided with hinge protrusions inserted into the protrusion insert holes of associated hinge parts, and the inside wings may have a stepped shape in such a way that opposite ends of the inside wings in a state in which the hinge protrusions are inserted into the protrusion insert holes selectively overlap with an upper surface of a partition wall and a lower surface of a neighboring partition wall along the plate part respectively.

The air vent apparatus for the vehicle may further include a duct flange provided on a part of the inner surface of the duct having no spacer, wherein the duct flange is coupled to the spacer and selectively overlaps with ends of the inside wings according to a rotation of the inside walls, and at least one duct protrusion and at least one first wing protrusion provided on overlapping ends of the duct flange and the inside wings respectively, wherein the at least one duct protrusion and the at least one first wing protrusion are offset from each other along an axial direction of the spacer such that a leakage of air through a gap between the duct and the inside wings is minimized when the inside wings are closed.

The air vent apparatus for the vehicle may further include at least one second wing protrusion protruding on one of two overlapping parts of neighboring inside wings, and at least one first wing notch provided on a remaining one of the two overlapping parts of the neighboring inside wings in such a way that the first wing notch faces the second wing protrusion, thereby minimizing a leakage of air through gaps between the inside wings in a state in which the inside wings close the duct.

The air vent apparatus for the vehicle may further include at least one second wing notch formed in an overlapping part of an inside wing, wherein the at least one second wing notch faces a corresponding overlapping part of a neighboring inside wing, thereby preventing a whistling noise from being generated when air passes through a gap between the inside wings in a state in which the inside wings close the duct.

The spacer may include two spacers and the two spacers are mounted to the inner surface of the duct.

The spacer may include a spacer protrusion protruding on the plate part in a direction opposed to the hinge parts, wherein, when the plate part is securely mounted to the inner surface of the duct, the spacer protrusion is inserted into a protrusion locking hole formed in the duct.

The air vent according to an exemplary embodiment of the present invention is advantageous in that the amount of air leaking through the gap between the duct and the inside wings, the gap between the inside wings, and the gap between the inside wings and the spacers can be minimized, and the inner pressure of the duct which has been increased by the reduction in the amount of leaking air can be efficiently distributed, thereby preventing the air from generating a whistling noise.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the invention, an example of which is illustrated in the accompanying drawings.

As shown in FIGS. 2A through 11, an air vent 3 for a vehicle according to an exemplary embodiment of the present invention includes a duct 10 that guides air into a passenger compartment, a plurality of inside wings 20 that can be rotated so as to switch the direction air is discharged in between the leftward and rightward directions, a plurality of outside wings 30 that can be rotated so as to switch the discharged direction of air between upward and downward directions, and a tab 40 that allows a user to rotate the inside and outside wings 20 and 30 and thereby change the directions of the inside and outside wings 20 and 30.

Figure 2A:
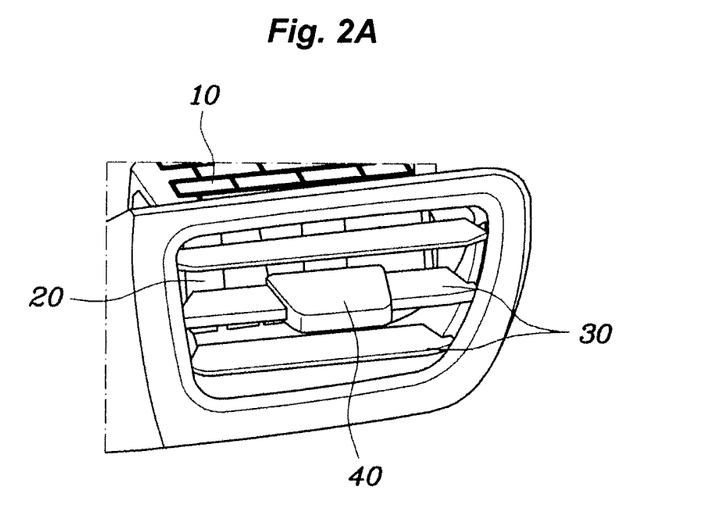
FIGS. 2A and 2B are a front view and a rear view of an air vent according to an exemplary embodiment of the present invention.
Figure 2B:
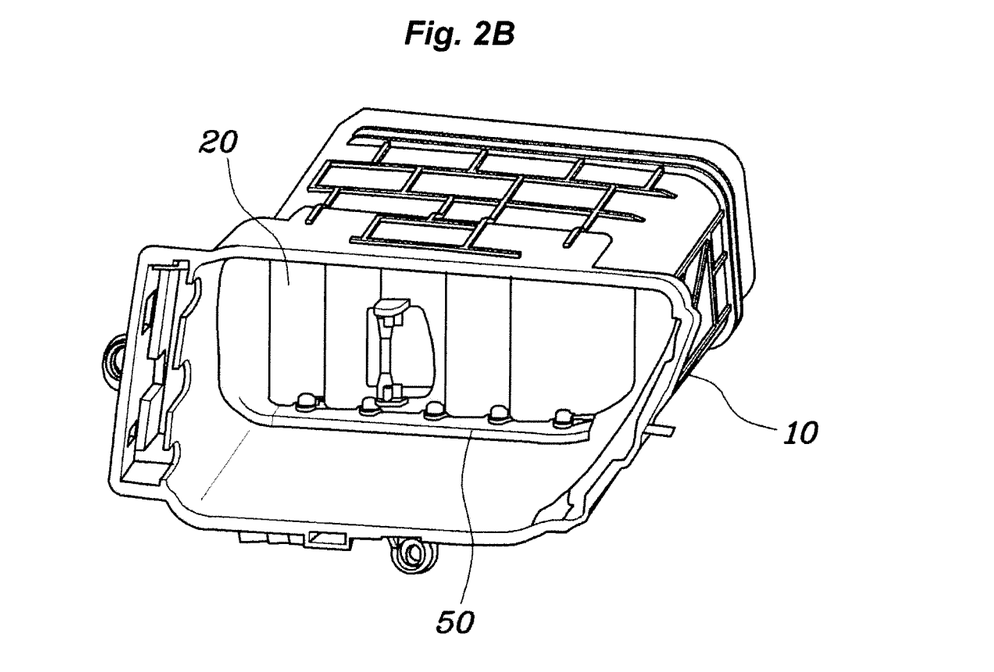
Figure 3A:
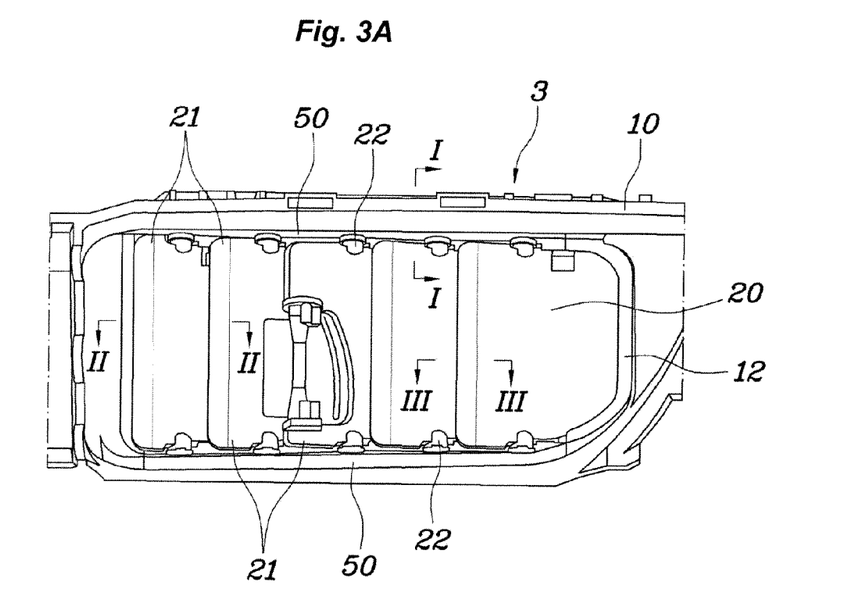
FIGS. 3A and 3B are a front view and a rear view of the air vent of FIGS. 2A and 2B, which illustrate inside wings of the air vent.
Figure 3B:
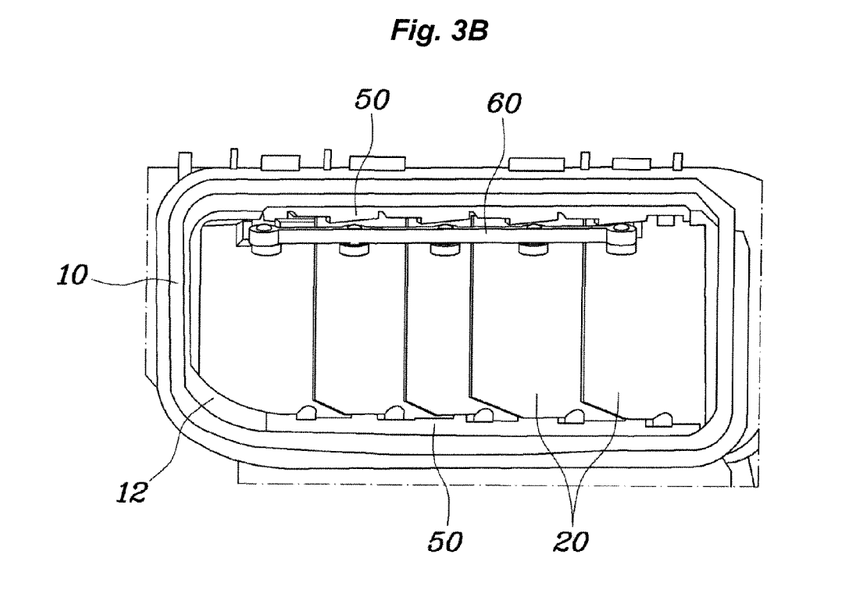
Figure 4A:
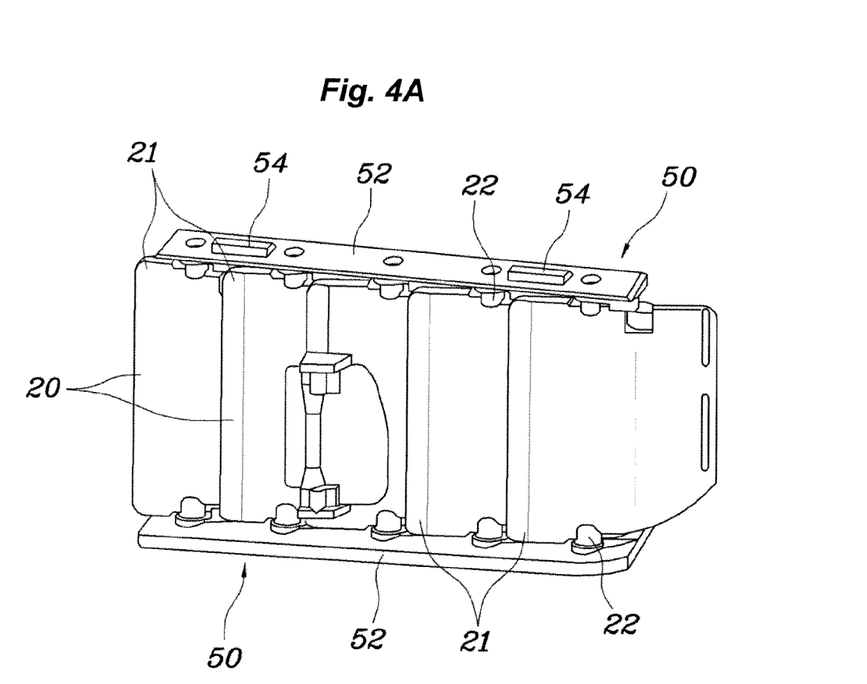
FIGS. 4A and 4B are a front view and a rear view of the air vent of FIGS. 3A and 3B, from which a duct is removed, illustrating a closed state of the inside wings.
Figure 4B:
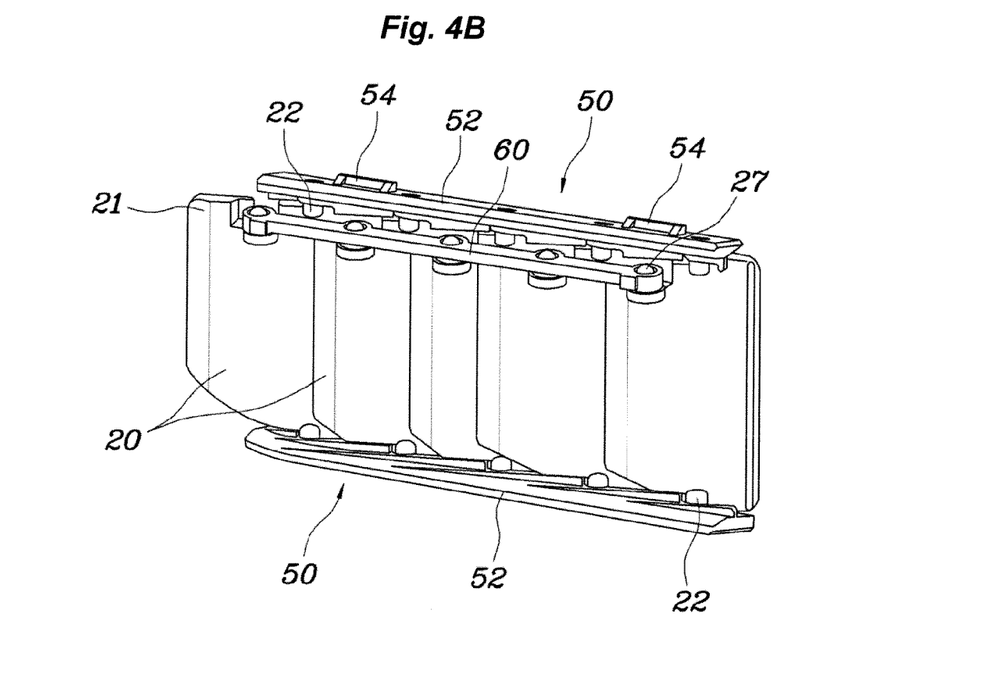
Figure 5A:
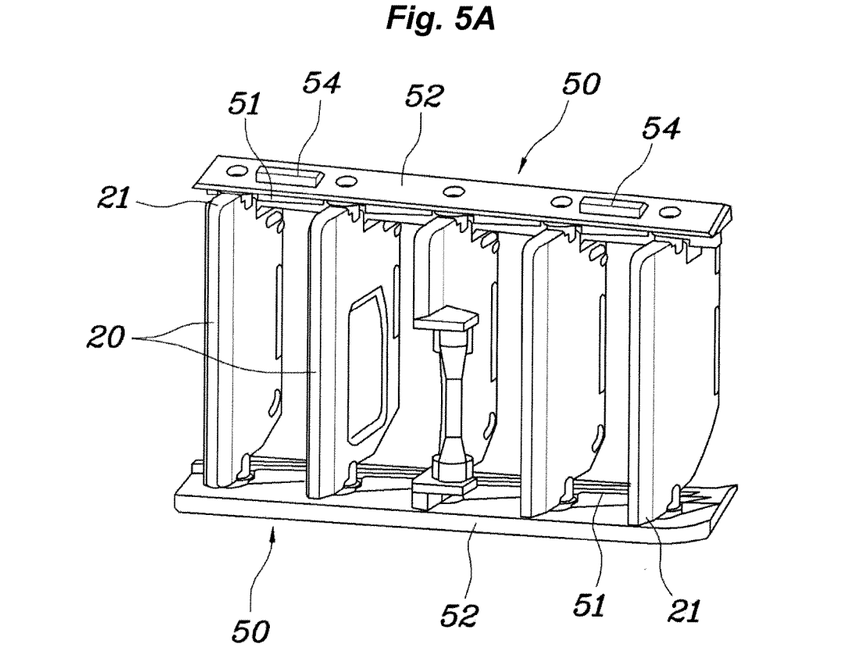
FIGS. 5A and 5B are a front view and a rear view of the air vent, which illustrate an open state of the inside wings.
Figure 5B:
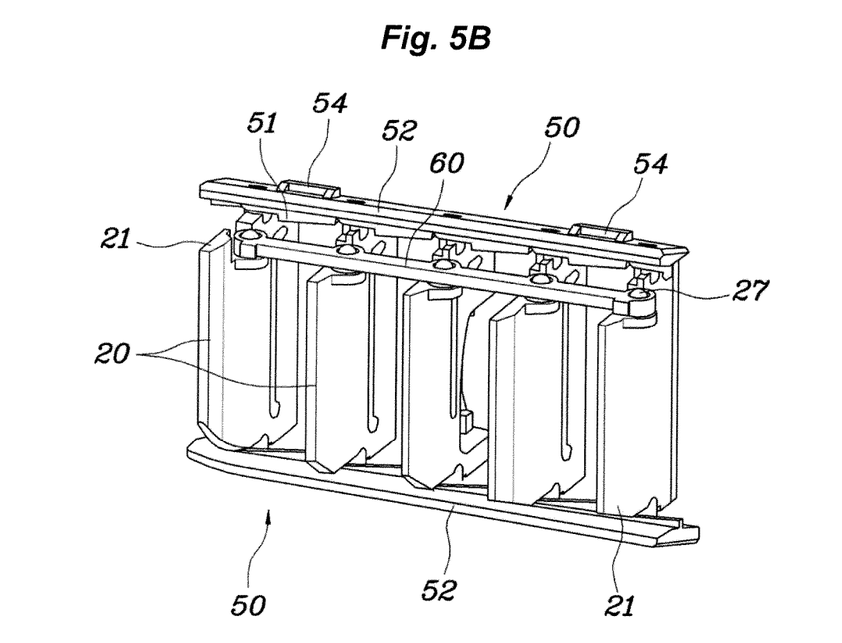

The tab 40 is connected both to the inside wings 20 and to the outside wings 30 so that, when the tab 40 is moved to the left or right in FIG. 2A, the tab 40 can be moved along an outside wing 30 and rotates the inside wings 20 in the same direction. However, when the tab 40 is moved upwards or downwards, the tab 40 can move only the outside wings 30 in the same direction.

Here, the inside wings 20 also function to close the duct 10 so as to prevent air from being discharged into the passenger compartment.

The air vent 3 according to an exemplary embodiment of the present invention has a structure which can increase the duct sealing force when the inside wings 20 close the duct 10 as described above. Therefore, the air vent can minimize the amount of air leaking into the passenger compartment and, at the same time, can reduce the inner pressure of the duct 10 which has been increased by the reduction in the amount of leaking air, thereby preventing the air from making a whistling noise along the path through which the air passes.

To realize the above-mentioned function, the air vent 3 according to an exemplary embodiment of the present invention includes a spacer 50 that is securely mounted to the inner surface of the duct 10 and has a plurality of partition walls 51 protruding in the inner space of the duct 10, and a plurality of inside wings 20 that are rotatably coupled to the spacer 50 so as to open or close the duct 10 and has respective overlapping parts 21 for overlapping with the partition walls 51 so as to increase the duct sealing force when the inside wings 20 close the duct 10.

The spacer 50 is installed in the duct 10 so as to allow the inside wings 20 to be rotated and typically comprises two spacers, and the two spacers 50 are mounted on the inner surface of the duct 10 so as to face each other.

Figure 6:
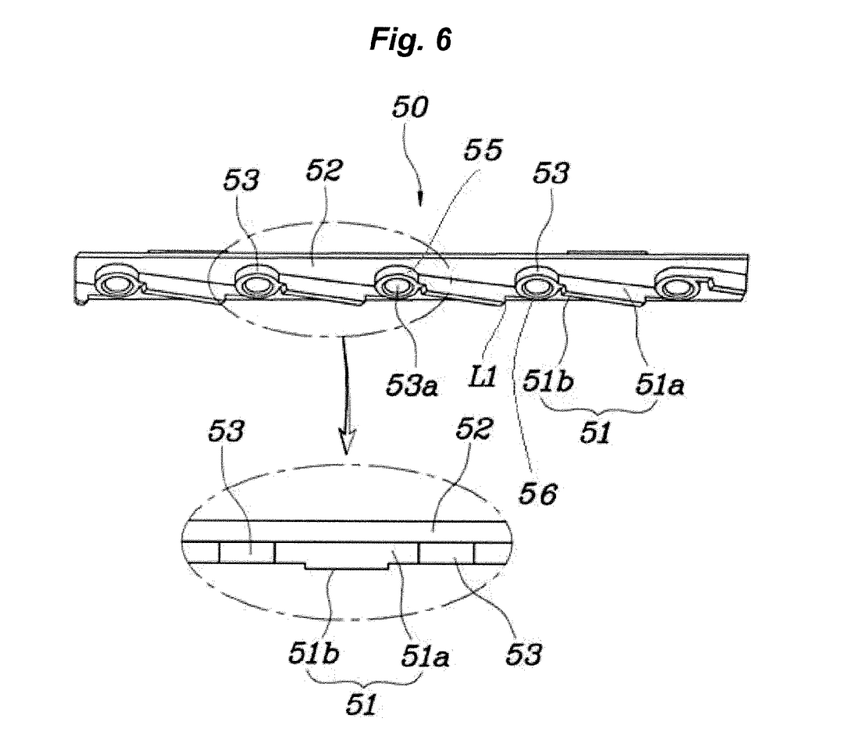
FIG. 6 is a view illustrating the structure of spacers according to an exemplary embodiment of the present invention.
Figure 7:
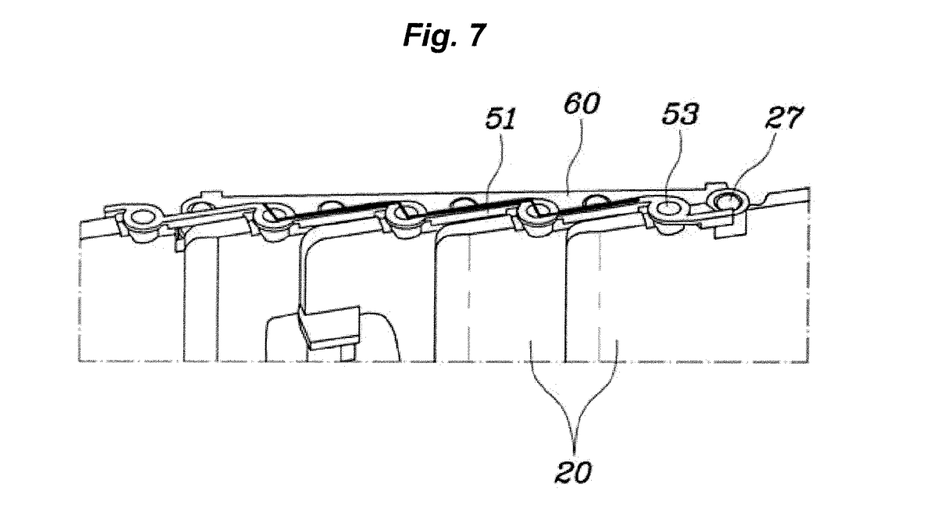
FIG. 7 and FIG. 8 are views illustrating a stepped structure formed by the spacers and the inside wings.

The spacer 50 further includes a plate part 52 that is closely and securely mounted to the inner surface of the duct 10, and a plurality of hinge parts 53 that are axially arranged on one surface of the plate part 52 at regular intervals and protrude in the inner space of the duct 10 and have respective protrusion insert holes 53a, and a plurality of spacer protrusions 54 that protrude on the plate part 52 in a direction opposed to the hinge parts 53.

The spacer protrusions 54 function to increase the locking force between the duct 10 and the spacer 50. When the plate part 52 is closely and securely mounted to the inner surface of the duct 10, the spacer protrusions 54 are inserted into respective protrusion locking holes 11 formed in the duct 10.

Further, the partition walls 51 are coupled to the hinge parts 53 in the axial direction of the plate part 52. The partition walls 51 are connected to upper and lower circumferences 55 and 56 of each neighboring hinge part.

Opposite ends of each of the partition walls 51 are coupled to associated hinge parts 53 so as to form a stepped shape so that the coupled structure of the partition walls 51 and the hinge parts 53 in the axial direction of the plate part 52 forms a stepped structure (see the thick line L1 in FIG. 6).

Due to the stepped coupled structure of the partition walls 51 and the hinge parts 53, a space for allowing rotation of the inside wings 20 to not be interfered with can be defined between the inside wings 20 and the spacers 50.

Further, each of the partition walls 51 includes a connection part 51a for coupling associated hinge parts 53 to each other, and a sealing part 51b integrally protruding from the connection part 51a with the thickness L1 and overlapping with the overlapping part 21 of an associated inside wing 20 when the inside wings 20 close the duct 10.

Here, neither of opposite ends of the sealing part 51b in the axial direction of the plate part 52 is coupled to the hinge parts 53. The reason for this is because, when the inside wings 20 coupled to the spacers 50 are rotated, the inside wings 20 can avoid then any interference with the sealing parts 51b.

Further, opposite end surfaces of each of the inside wings 20 are provided with hinge protrusions 22 inserted into the protrusion insert holes 53a of associated hinge parts 53. Here, it is that the inside wings 20 be configured to form a stepped shape (see the thick line L2 in FIG. 8) in such a way that opposite ends of the inside wings 20 in a state in which the hinge protrusions 22 are inserted into the protrusion insert holes 53a can overlap with upper and lower surfaces of the partition walls 51 along the plate part 52.

Figure 8:
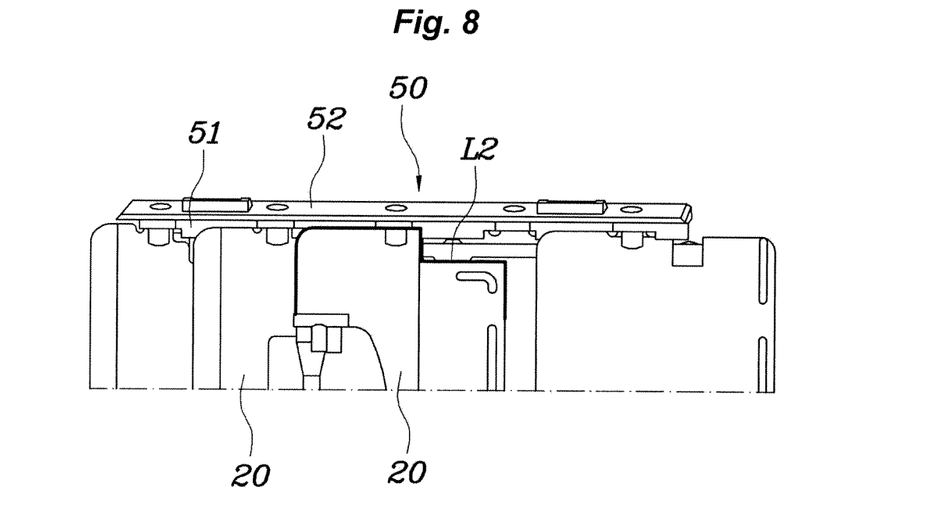

Due to both the stepped coupled structure of the partition walls 51 and the hinge parts 53 and the stepped shape of the inside wings 20, a space for allowing the rotation of the inside wings 20 to not be interfered with can be defined between the inside wings 20 and the spacers 50.

Therefore, when the duct 10 is closed by the inside wing 20, the gap between the inside wings 20 and the spacers 50 can be remarkably reduced both by the overlapping parts 21 of the inside wings 20 and by the partition walls 51 of the spacers 50. Accordingly, when air in the duct 10 flows into the passenger compartment through reduced paths defined between the inside wings 20 and the spacers 50 as shown by the arrow M1 in FIG. 9, vortexes are generated in the reduced paths.

Figure 9:
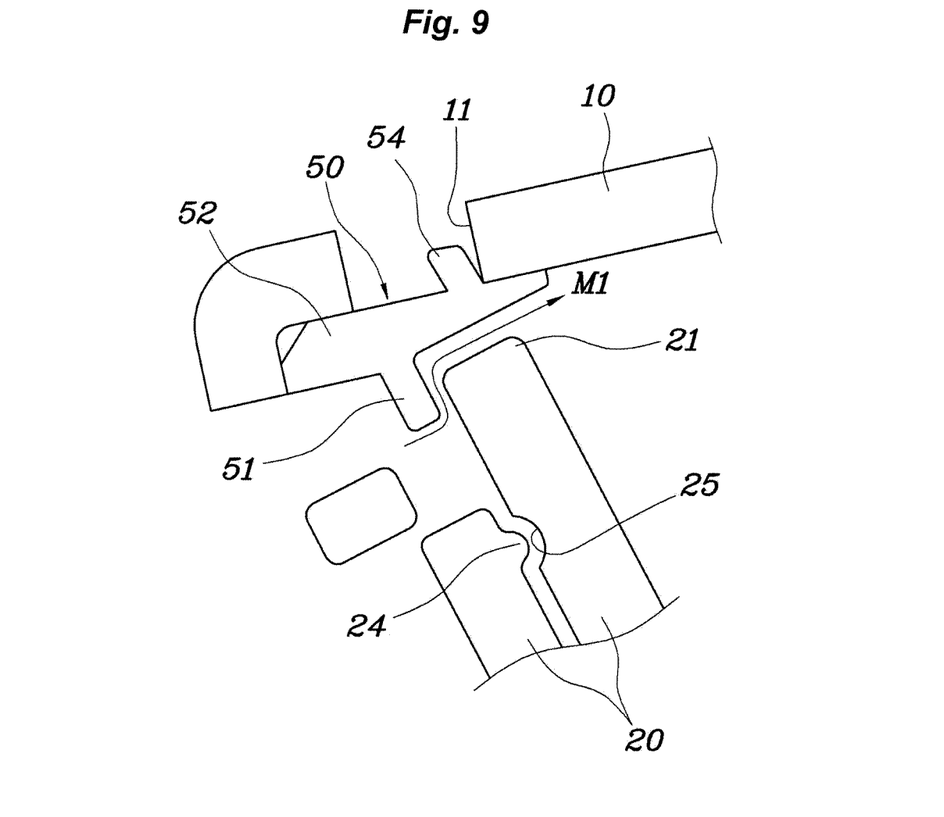
FIGS. 9 through 11 are sectional views taken along lines I-I, II-II and of FIG. 3A, respectively.

The vortexes intrinsically disturb the air flow so that the amount of air leaking to the passenger compartment through the reduced paths defined between the inside wings 20 and the spacers 50 is remarkably reduced.

Figure 10:
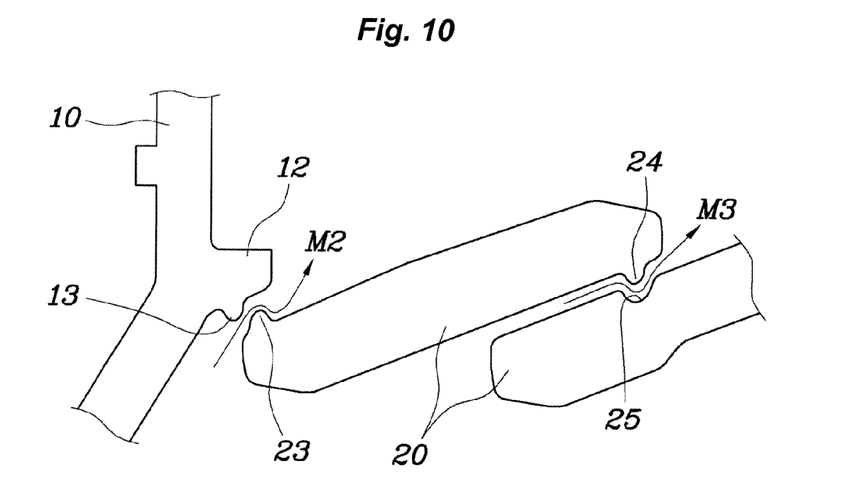

Further, the duct 10 is provided on a part of the inner surface thereof having no spacer 50 with a duct flange 12, which is coupled to the spacer 50 and overlaps with the ends of the inside wings 20. Further, at least one duct protrusion 13 and at least one first wing protrusion 23 are provided on the overlapping ends of the duct flange 12 and each of the inside wings 20 in such a way that the duct protrusion 13 and the first wing protrusion 23 are offset from each other along the axial direction of the spacer 50 and can minimize the amount of air leaking through the gap between the duct 10 and the inside wings 20.

Therefore, when the inside wings 20 close the duct 10, the gap between the duct flange 12 and the inside wings 20 can be remarkably reduced both by the duct protrusion 13 and by the first wing protrusion 23. Therefore, when air in the duct 10 flows to the passenger compartment through a reduced path defined between the duct protrusion 13 and the first wing protrusion 23 as shown by the arrow M2 in FIG. 10, a vortex is generated in the reduced path.

The vortex intrinsically disturbs the air flow so that the amount of air leaking to the passenger compartment through the reduced path defined between the duct flange 12 and the inside wing 20 is remarkably reduced.

Further, in order to minimize the amount of air leaking through the gaps between the inside wings 20 in a state in which the inside wings 20 close the duct 10, at least one second wing protrusion 24 protrudes on one of two overlapping parts of neighboring inside wings 20, while at least one first wing notch 25 is provided on a remaining one of the two overlapping parts of the neighboring inside wings 20 in such a way that the first wing notch 25 faces the second wing protrusion 24.

Therefore, when the inside wings 20 close the duct 10 and air flows into the passenger compartment through a gap between the inside wings 20 as shown by the arrow M3 in FIG. 10, a vortex is generated in the air current at a location having both the second wing protrusion 24 and the first wing notch 25, so that the amount of air leaking to the passenger compartment through the gap between the inside wings 20 can be remarkably reduced.

When the amount of air leaking to the passenger compartment in a state in which the inside wings 20 close the duct 10 is remarkably reduced by the above-mentioned structure of the present invention, the inner pressure of the duct 10 is increased. Without a reduction in the increased inner pressure of the duct 10, a substantial level of whistling noise is generated by the air flow.

Figure 11:
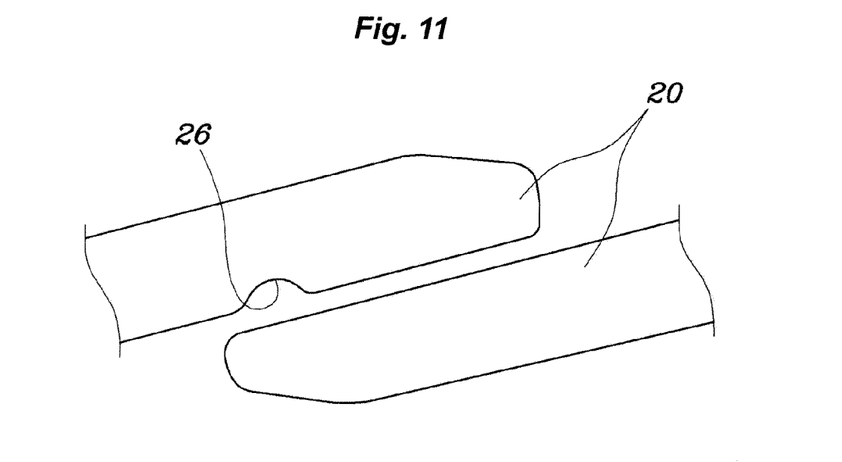

Therefore, to reduce the inner pressure of the duct 10, the present invention provided at least one second wing notch 26 formed in the overlapping part of the inside wings 20 as shown in FIG. 11. When the second wing notch 26 is provided as described above, the sectional area of the gap between the inside wings 20 is partially increased at a location having the second wing notch 26, so that the inner pressure of the duct 10 can be efficiently reduced, thereby preventing the whistling noise from being generated as air passes through the gap between the inside wings 20.

The plurality of inside wings 20 must be configured in such a way that, when the tab 40 is operated, the inside wings 20 can be rotated at the same time. In order to realize the above-mentioned configuration, the plurality of inside wings 20 are coupled to each other using one linkage 60 and are provided with respective linkage protrusions 27 for being coupled to the linkage 60.

The structure of the above-mentioned linkage 60 is also used in the outside wings 30.

As described above, the air vent 3 according to an exemplary embodiment of the present invention can minimize the amount of air leaking through the gap between the duct 10 and the inside wings 20, the gap between the inside wing 20 and the gap between the inside wings 20 and the spacers 50, thereby imparting passengers with a comfortable riding feeling.

Further, the present invention can efficiently distribute the inner pressure of the duct 10 which has been increased by the reduction in the amount of leaking air, so that it is possible to prevent the whistling noise of air from being generated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air vent apparatus for a vehicle comprising:
    a spacer securely mounted to an inner surface of a duct and having a plurality of partition walls protruding in an inner space thereof; and
    a plurality of inside wings rotatably coupled to the spacer and opening or closing the duct wherein the inside wings have respectively overlapping parts for overlapping with the partition walls when the inside wings close the duct so as to increase a duct sealing force between the inside wings and the spacer,
    wherein the spacer further includes:
        a plate part securely mounted to the inner surface of the duct; and
        a plurality of hinge parts axially arranged on the inner surface of the plate part at regular intervals and protruding into an inner space of the duct and having respectively protrusion insert holes therein to which the inside wings are rotatably coupled, and wherein the partition walls are coupled to the hinge parts in a longitudinal direction of the plate part,
    wherein each of the partition walls includes:
        a connection part for coupling associated hinge parts to each other on the plate part; and
        a rectangular tab integrally protruding from the connection part such that a major surface of the rectangular tab is co-planar with a major surface of the inside wings when the inside wings are in a closed position and selectively overlapping with an overlapping part of an associated inside wing when the associated inside wing closes the duct, and
        wherein neither opposite end of the rectangular tab in a longitudinal direction of the plate part is coupled to the associated hinge parts.

2. The air vent apparatus for the vehicle as set forth in claim 1, wherein the partition walls are connected to an upper circumference in a first one of two neighboring hinge parts and a lower circumference in a second one of the two neighboring hinge parts.

3. The air vent apparatus for the vehicle as set forth in claim 1, wherein opposite ends of each of the partition walls are coupled to associated hinge parts and form a stepped shape so that a coupled structure of the partition walls and the hinge parts in the longitudinal direction of the plate part forms a stepped structure and a thickness of the partition walls is larger than the associated hinge parts.

4. The air vent apparatus for the vehicle as set forth in claim 1, wherein:
    opposite side surfaces of each of the inside wings are provided with hinge protrusions inserted into the protrusion insert holes of associated hinge parts; and
    the inside wings have a stepped shape in such a way that opposite ends of the inside wings in a state in which the hinge protrusions are inserted into the protrusion insert holes selectively overlap with an upper surface of a partition wall and a lower surface of a neighboring partition wall along the plate part respectively.

5. The air vent apparatus for the vehicle as set forth in claim 1, further including:
    a duct flange provided on a part of the inner surface of the duct having no spacer, wherein the duct flange is coupled to the spacer and selectively overlaps with ends of the inside wings according to a rotation of the inside wings; and
    at least one duct protrusion and at least one first wing protrusion provided on overlapping ends of the duct flange and the inside wings respectively, wherein the at least one duct protrusion and the at least one first wing protrusion are offset from each other along an axial direction of the spacer such that a leakage of air through a gap between the duct and the inside wings is minimized when the inside wings are closed.

6. The air vent apparatus for the vehicle as set forth in claim 1, further including:
    at least one second wing protrusion protruding on one of two overlapping parts of neighboring inside wings; and
    at least one first wing notch provided on a remaining one of the two overlapping parts of the neighboring inside wings in such a way that the first wing notch faces the second wing protrusion, thereby minimizing a leakage of air through gaps between the inside wings in a state in which the inside wings close the duct.

7. The air vent apparatus for the vehicle as set forth in claim 1, further including:
    at least one second wing notch formed in an overlapping part of an inside wing, wherein the at least one second wing notch faces a corresponding overlapping part of a neighboring inside wing, thereby preventing a whistling noise from being generated when air passes through a gap between the inside wings in a state in which the inside wings close the duct.

8. The air vent apparatus for the vehicle as set forth in claim 1, wherein the spacer includes two spacers and the two spacers are mounted to the inner surface of the duct.

9. The air vent apparatus for the vehicle as set forth in claim 1, wherein the spacer includes a spacer protrusion protruding on the plate part in a direction opposed to the hinge parts, wherein, when the plate part is securely mounted to the inner surface of the duct, the spacer protrusion is inserted into a protrusion locking hole formed in the duct.

* * * * *